Aug. 3, 1954 D. O. DAVIES 2,685,334
FUEL METERING MEANS FOR GAS-TURBINE ENGINE FUEL SYSTEMS
Filed May 1, 1950 3 Sheets-Sheet 1

INVENTOR
D. O. DAVIES

Aug. 3, 1954  D. O. DAVIES  2,685,334
FUEL METERING MEANS FOR GAS-TURBINE ENGINE FUEL SYSTEMS
Filed May 1, 1950  3 Sheets-Sheet 2

INVENTOR
D. O. DAVIES
by Wilkinson Mawhinney
Attys.

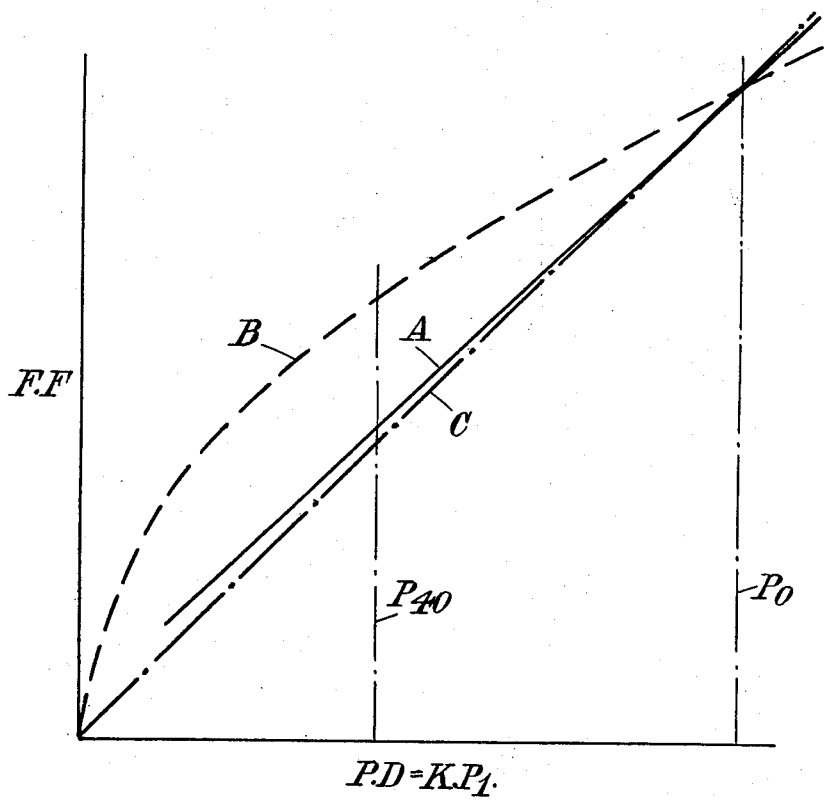

Patented Aug. 3, 1954

2,685,334

UNITED STATES PATENT OFFICE 2,685,334

FUEL METERING MEANS FOR GAS-TURBINE ENGINE FUEL SYSTEMS

David Omri Davies, Edgware, England, assignor to Rolls-Royce Limited, Derby, England, a British company Application May 1, 1950, Serial No. 159,162

Claims priority, application Great Britain August 18, 1949

11 Claims. (Cl. 158—36.4)

This invention relates to fuel systems for gas-turbine engines, and is particularly concerned with systems of the kind (hereinafter referred to as fuel systems of the kind specified) in which a pressure-responsive device subjected to an atmospheric air pressure is operative to maintain a predetermined fuel pressure difference across an orifice-type fuel-flow-metering device whereof the effective orifice area is selectively variable to vary the fuel flow therethrough arising from said pressure difference, and wherein said predetermined fuel pressure difference is controlled by the pressure responsive means to have a substantially directly proportional relationship with the atmospheric air pressure to which the pressure responsive means is subjected.

The term "atmospheric air pressure" used in this specification includes ambient atmospheric pressure (i. e. static pressure), or ambient atmospheric pressure as modified by flight of an aircraft, and/or as modified by the conditions prevailing in the air intake to the compressor of the gas-turbine engine. Thus, for example, a connection to the pressure responsive device may be made to a static pressure point on the aircraft, to a static or total head point in the air intake of the compressor or to a total head point on the aircraft.

One known form of fuel system of the kind specified, as used in connection with gas-turbine engines, includes a pump of variable capacity type, the capacity being controlled by a servo mechanism including a piston and cylinder device which is subjected to a servo-fluid pressure derived from a suitable fluid pressure source and which device is itself controlled by a servo-fluid outflow metering valve which determines the outflow of servo-fluid from one side of the piston. The outflow metering valve is actuated by means of an operating lever which is subjected to three principal loads. The first load is applied to the lever by an evacuated capsule subjected externally to atmospheric air pressure such that the load increases with decrease of this pressure in a manner substantially proportional to the value of the pressure; the second load is applied to the lever in the same sense as the first load through a pressure-sensitive device which is sensitive to the fuel pressure difference to be controlled; and the third load is applied to the lever by a spring in a sense opposite to that of the first and second loads. In this manner the sum of the moments due to the loads exerted by the evacuated capsule and by the controlled fuel pressure difference remains substantially constant and equal to that of the opposing moment due to the load exerted by the spring. Thus the value of the fuel pressure difference decreases substantially proportionally with the decrease of the atmospheric air pressure to which the evacuated capsule is subjected.

The present invention has for an object to provide in fuel systems of the kind specified an improved arrangement of orifice-type fuel-flow-metering device, which will give rise to certain desirable characteristics in the operation of the engine.

According to the present invention in a fuel system of the kind specified, the orifice-type fuel-flow-metering device comprises a first orifice means arranged so that its effective area is selectively variable and so that for any selected effective area the pressure drop across it is substantially proportional to the square of the fuel flow therethrough, and a second orifice means connected hydraulically in parallel with said first orifice means, said second orifice means being arranged so that the fuel flow therethrough is substantially directly proportional to pressure drop across it.

It is desired to make clear, though it is thought that the fact will be apparent from the context, that where the phase "directly proportional" is used in this connection, a straight-line proportionality is intended between fuel flow and pressure drop, such as may be expressed by the relationship $FF = K_1 + K_2 PD$, where $FF$ represents fuel flow, $PD$ represents pressure drop, and $K_1$ and $K_2$ are suitable constants.

Preferably, the second orifice means is given such a fuel-flow/pressure drop characteristic that, when the selected effective area of the first orifice means is small or zero, and therefore a substantial part or the whole of the fuel being fed to the engine passes through the second orifice means, the fuel flow defined by each predetermined value of the difference in the pressures on each side of the orifice-type fuel-flow-metering device as determined by the pressure-responsive means is substantially equal to the engine fuel requirements during idling or low-power operation at the corresponding atmospheric air pressure.

Adoption of the invention enables an undesirable characteristic of the known arrangement of orifice-type fuel-flow-metering device, which comprises a simple adjustable-area orifice, to be avoided. The undesirable characteristic is that with an idling or low-power setting of the simple adjustable-area orifice the fuel flow to and thus the rotational speed of the engine increases with decrease of the atmospheric air pressure. This undesirable characteristic is due to the fact that with the known arrangement the fuel flow is approximately proportional to the square root of the predetermined difference of pressures on each side of the orifice-type fuel-flow-metering device (and thus to the square root of the atmospheric air pressure to which the pressure responsive means is subjected) and to the fact that the engine fuel requirements are substantially directly proportional to the atmospheric air pressure. Clearly this undesirable characteristic can be avoided by adoption of the invention since the second orifice means has a linear fuel flow/pressure drop characteristic and since this characteristic can readily be chosen to approximate to the engine fuel requirements/atmospheric air pressure characteristic, Preferably for idling or low-power operation of the engine the first orifice means is arranged to be set to have a zero effective area so that the whole of the fuel for idling or low-power operation passes through the second orifice means only. However, it may be desirable under certain circumstances to arrange that for idling or low-power operation, the first orifice means has a small effective area so that a proportion of the fuel requirements for idling or low-power operation passes through the first orifice means, the remainder passing through the parallel-arranged second orifice means.

The present invention may be used in combination with further additional orifice means, such as is described in co-pending application Serial No. 159,161, filed May 1, 1950 in the name of A. Jubb, now Patent No. 2,605,707, issued Aug. 5, 1952, which further orifice means also has a linear fuel-flow/pressure drop characteristic and is arranged hydraulically in series with the first and second orifice means.

Orifice means having a characteristic such that the pressure drop is substantially directly proportional to fuel flow therethrough is hereinafter referred to as "a linear flow valve", and may conveniently comprise a conical valve member suitably proportioned to define in conjunction with a valve port and with a spring loading on the valve member an effective orifice area giving the desired linear fuel-flow/pressure drop characteristic.

One embodiment of the invention will now be described as applied in a known fuel system for a gas-turbine engine. The description makes reference to the accompanying drawings in which:

Figure 3 is a graph illustrating the effect of the invention.

Figure 1:
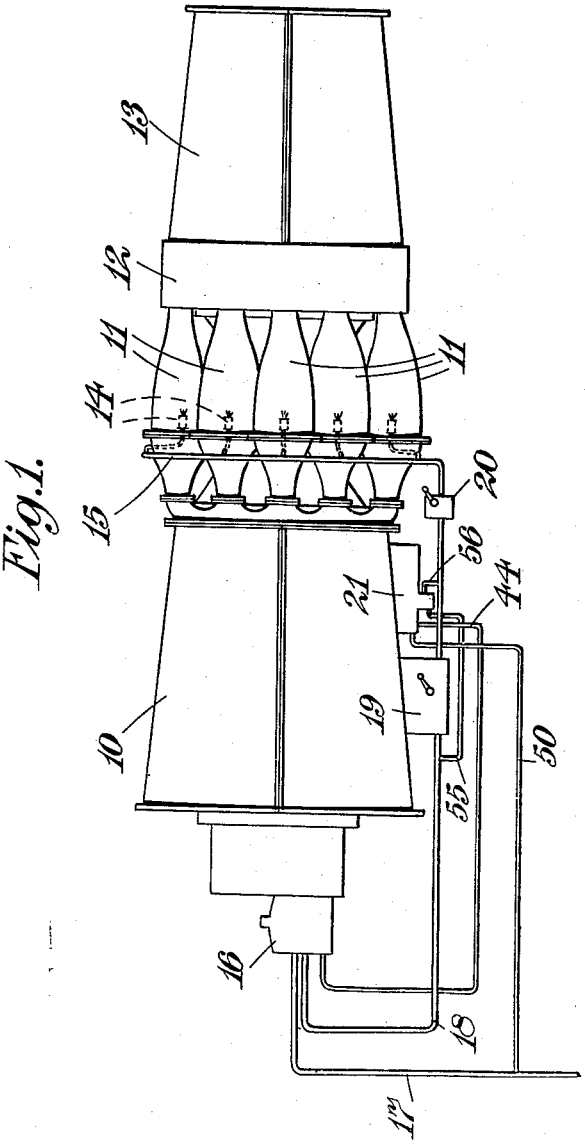
Figure 1 illustrates diagrammatically a gas-turbine engine and the fuel system therefor.

Referring to Figure 1, there is illustrated a simple gas-turbine engine suitable for propelling an aircraft by jet-propulsion and comprising a compressor 10 illustrated as of the axial-flow type, combustion equipment illustrated as comprising a plurality of combustion chambers 11 connected to the delivery of the compressor 10 to receive compressed air therefrom, a turbine 12 for driving the compressor connected to receive hot gases from the combustion chambers 11 and an exhaust unit 13. A jet-pipe having a propulsion nozzle (not shown) will be connected to the end of the exhaust assembly 13.

Fuel is burnt in the combustion chambers 11 to heat the air delivered thereto and the fuel is delivered into the combustion chambers by fuel injection devices 14 which are connected to a common manifold 15 from the engine fuel supply system.

Figure 2:
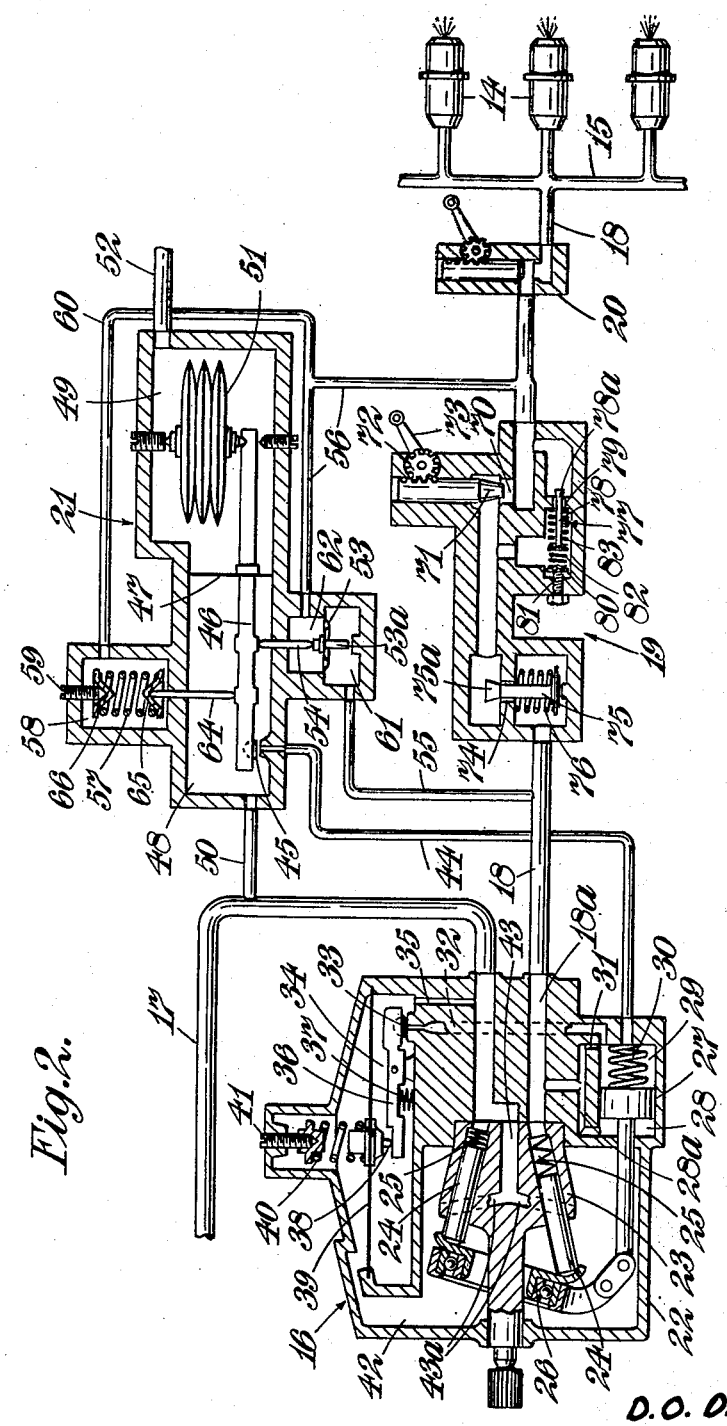
Figure 2 illustrates the fuel system in more detail.

The engine fuel supply system is illustrated in Figures 1 and 2 and comprises an engine-driven fuel pump 16 which is illustrated as being of variable-delivery type and which draws in fuel from a fuel tank (not shown) through a suction pipe 17 and delivers the fuel under pressure through a pipe-line 18 which is connected to the manifold 15 leading to the fuel injection devices 14.

Located in the fuel delivery pipe 18 there is an orifice-type fuel-flow-metering device 19 and a shut-off valve 20. The shut-off valve is fully open when the engine is running and fully closed when the engine is not running.

The fuel system also comprises a device 21, referred to hereinafter as a barometric flow control, which device is arranged to control the difference in the pressures in pipe-line 18 just upstream and just downstream of the orifice-type fuel-flow-metering device 19.

The fuel pump 16 which as stated is of the variable-delivery type, comprises a pump rotor 23 formed with a series of substantially axial bores, a plurality of plungers 24 in the bores in the pump rotor 23, a swash-plate mechanism 26 co-operating with the outer ends of the plungers so that on rotation of the pump rotor 23 the plungers 24 are reciprocated in the bores in the pump rotor 23 by the swash-plate mechanism 26 against the action of springs 25.

The stroke of the pump plungers 24 and thus the fuel delivery of the pump 16 is controlled by the inclination of the swash-plate mechanism 26 to the axis of rotation of the pump rotor 23, and a servo-mechanism is provided to adjust the angle of inclination of the swash-plate mechanism to the pump rotor axis.

The servo mechanism comprises a piston 27 working in a cylinder divided into two chambers 28, 29 and a spring 30 is located in the chamber 29 to load the piston 27 in a manner tending to move it to increase the angle of inclination of the swash-plate mechanism 26 and thus to increase the stroke of the pump plungers 24 and the pump fuel delivery. The chamber 28 is connected by a duct 28a to the fuel delivery port 18a of the pump 16 so that the pressure within the chamber 28 is the fuel delivery pressure. The chamber 29 is also connected with the pump delivery port 18a through the duct 28a but there is additionally provided a restricted inlet 31 to the space 29.

Also connected to the chamber 29 there is a bleed pipe 44 and a bleed passage 32. It will be seen that if there is no bleed from the chamber 29 then the fluid pressures in the two chambers 28 and 29 are equal and the piston 27 will be urged to the left (as viewed in the drawings) to move the swash-plate mechanism to the maximum stroke position for the pump plungers 24.

The bleed passage 32 is associated with a top speed governor mechanism comprising a half-ball valve element 33 arranged to control the outflow of fluid from the chamber 29 through the passage 32, and the half-ball valve 33 is carried on a pivoted lever 36 which is loaded by a spring 37 in a direction tending to close the half-ball valve on to the outlet from the passage 32. The bleed from the passage 32 flows into a chamber 34 and thence through a duct 35 to the suction side of the fuel pump 16.

The chamber 34 is separated from a further chamber 42 by means of a flexible diaphragm 39 carrying a tappet element 38 which under certain operating conditions of the pump 16 engages with the lever 36 to rock it in a direction to lift the half-ball valve 33. The diaphragm has connected to it a tension spring 40 having an adjustable abutment 41 and the tension spring 40 tends to hold the tappet 38 out from engagement with the lever 36. The chamber 42 is pressurised by a centrifugal pump formed in the rotor 23, by a central axial bore 43 connected at one end with the suction side of the pump 16 and connected at the other end with a series of substantially radial bores 43a which open into the chamber 42.

As the engine speed increases and thus the speed of rotation of the pump rotor 23 increases the pressure within the chamber 42 increases, and it is arranged that when the engine rotational speed reaches its maximum permissible value the fluid pressure load on the diaphragm 39 is sufficient to overcome the spring 40 and to allow the tappet 38 to engage the lever 36 to bleed off servo fluid from the chamber 29, thus causing a reduction of the pressure within the chamber 29 and a decrease in the pump stroke.

The outflow of servo fluid from the chamber 29 through the pipe 44 is controlled by the barometric flow control 21 so as to control the difference in the pressures in the fuel delivery pipe 18 just upstream and just downstream of the orifice-type fuel-flow-metering device 19 to be substantially proportional to an atmospheric pressure which may be either the ambient atmospheric pressure or the ambient atmospheric pressure as modified by flight of an aircraft or ambient atmospheric pressure as modified by the conditions prevailing in the air-intake to the compressor 10 or as modified by both the speed of flight and the conditions prevailing in the air-intake of the compressor 10.

The barometric flow control 21 comprises a half-ball valve element 45 carried on a lever 46 supported by a flexible diaphragm 47 which separates the barometric pressure control into two chambers 48 and 49. The servo fluid flowing through the pipe 44 enters the chamber 48 under control of the half-ball valve 45 and thence passes through a return pipe 50 back to the suction pipe 17. The chamber 49 is connected through a conduit 52 to a suitable atmospheric pressure point on the aircraft or in the engine.

The lever 46 is arranged to be rocked under the control of three principal loads as follows:

(a) A load which varies in accordance with variations of the atmospheric air pressure. This load is applied to the lever through an expansible capsule 51 accommodated in the chamber 49, and it will be seen that as the atmospheric air pressure decreases the load afforded on the lever 46 by the capsule 51 increases, and that as the atmospheric air pressure increases the load afforded by the capsule 51 decreases. The load applied by the capsule 51 is in a direction tending to rock the lever 46 to lift the half-ball valve 45.

(b) A load which is dependent on the difference in the fuel pressures in the fuel delivery pipe 18 just upstream of and just downstream of the orifice-type fuel-flow-metering device 19. This load is applied to the lever 46 through a tappet 54 under control of a flexible diaphragm 53 separating a pair of chambers 61 and 62, whereof the chamber 61 is connected by a pipe 55 to the fuel delivery pipe 18 just upstream of the orifice-type fuel-flow-metering device 19 and whereof the chamber 62 is connected by a pipe 56 to the fuel delivery pipe 18 just downstream of the device 19. The diaphragm 53 carries a stop 53a to limit its movements in a direction away from the lever 46. The load which is dependent on this pressure difference in the fuel delivery pipe 18 is applied to the lever 46 in the same direction as is the load due to the capsule 51.

(c) A spring load applied to the lever 46 in a direction to oppose the loads applied to the lever 46 by the capsule 51 and the diaphragm 53. The spring load is applied to the lever through a tappet 64 carrying at its outer end an abutment member 65 for a compression spring 57 accommodated in a chamber 58 separated from the chamber 48. The other abutment 66 for the spring 57 is adjustable by means of a set screw 59. The chamber 58 is connected by pipe 60 to pipe 56 so that the pressure in chambers 58 and 62 are equal; this arrangement compensates for the difference in the effective areas of the sides of diaphragm 53 due to the presence of tappet 54.

In operation of the barometric flow control the moments of the loads applied to the lever 46 by the capsule 51 and the diaphragm 53 are, under steady running conditions, balanced by the moment of the load applied by the spring 57. If the atmospheric air pressure remains constant then the barometric flow control operates to maintain the difference in pressure at a given value and if an unwanted increase in the difference in pressure occurs the half-ball valve is lifted so permitting a bleed from the chamber 29 and a reduction in fuel delivery, and if an unwanted decrease in the pressure difference occurs the half-ball valve 45 is closed more firmly so that the pump stroke increases and the fuel delivery into the fuel delivery pipe 18 also increases. On increase of the atmospheric air pressure the capsule 51 collapses decreasing the load applied by it to the lever 46 and thus increasing the load due to the fuel pressure difference necessary to balance the load due to spring 57. Thus when the atmospheric air pressure increases the fuel delivery will increase. Conversely, if the atmospheric air pressure decreases the load due to the capsule will increase and the fuel delivery by the pump 16 will be decreased to reduce the difference in pressures on each side of the device 19. The difference in fuel pressures is substantially directly proportional to the atmospheric air pressure.

The orifice-type fuel-flow metering device 19 comprises a throttle valve comprising an orifice 70, the effective area of which is determined by a valve member 71 co-operating with the orifice 70, and the position of the valve member 71 in the orifice 70 is adjustable by means of a manual control lever 73 through any suitable mechanism 72 which is illustrated as a rack and pinion.

It has been found that if the device 19 comprises only the variable-area orifice 70, the pressure drop across which is substantially proportional to the square of the fuel flow therethrough for any given setting of the valve member 71, then for any selected area of the orifice the engine rotational speed increases as the atmospheric air pressure decreases, due to the fact that the quantity of fuel reaching the engine exceeds at altitude that required to maintain a constant rotational speed.

This difficulty is overcome for settings of the variable-area orifice corresponding to high-power operation of the engine by providing, as described in co-pending U. S. application Serial No. 159,161, a linear flow valve hydraulically in series with the variable-area orifice 70 and by arranging that the controlled difference of pressures is the sum of the pressure drops across the linear flow valve and the variable-area orifice 70. The linear flow valve comprises an orifice 74 the effective area of which is arranged to be varied by means of the valve member 75 which is loaded by a spring tending to reduce the effective area of the orifice 74. The portion 75a of the valve member 75, that is the portion of the valve member which co-operates with the orifice 74, is so shaped, for example is made conical, and the rate of the spring 76 is so selected that a linear fuel-flow/pressure drop characteristic is obtained.

Under idling or low-power operating conditions of a gas-turbine engine the fuel required by the engine is substantially directly proportional to the atmospheric air pressure, and the difficulty mentioned above is overcome according to the present invention for idling or low-power operation of the engine by arranging that, when the control lever 73 is adjusted to select idling or low-power operation of the engine, the orifice 70 is completely closed by the valve member 71 and by providing hydraulically in parallel with the orifice 70 orifice means 77 having a linear fuel-flow/pressure drop characteristic. Thus with the arrangement shown the fuel flow to the engine passes wholly through the orifice means 77 and the fuel flow to the engine will be directly proportional to the atmospheric air pressure, since both the orifice means 77 and the orifice means 74 to 76 have linear fuel-flow/pressure drop characteristics and since the difference in the fuel pressures on each side of the device 19 is controlled to be proportional to the atmospheric air pressure by the barometric pressure control 21.

The orifice means 77 comprises a valve member 78 having a shaped portion 78a co-operating with an orifice 79 to adjust its effective area, and a pair of springs 82, 83 loading the valve member 78 in a manner tending to reduce the effective area of the orifice 79. When fuel is flowing through the orifice 79 the fuel pressure tends to move the valve element 78 in a direction to increase the effective area and it will be seen that for a given fuel flow the valve member will take up a balanced position in which the fuel pressure on the valve member 78 is balanced by the load of the springs 82, 83. By suitable selection of the shape of the portion 78a of the valve member 78, and by suitable selection of the rates of the springs 82 and 83 it can be arranged that the fuel flow through the orifice 79 is proportional to the pressure drop across it. The spring 82 is provided with an abutment 80 which is adjustable by means of a set-screw 81 to adjust the characteristics of the orifice means 77.

If it is desired merely to correct the fuel flow to the engine to avoid increase of speed with altitude for the idling and low-power setting of the control lever 73, then the linear flow valve 74 to 76 can be omitted and in these circumstances under idling or low-power operation the difference in pressures on each side of the device 19 will be the pressure drop across the orifice means 77.

Referring now to Figure 3, which is a graph illustrating the effect of the invention and in which fuel flows FF are plotted as ordinates and pressure drops PD (which are proportional to atmospheric air pressure) are plotted as abscissae, curve A indicates the fuel actually required by a simple jet-propulsion engine such as is illustrated in Figure 1 to maintain a constant idling or low-power rotational speed for various values of the controlled difference in fuel pressures. The vertical lines $P_0$ and $P_{40}$ indicate the values to which the pressure difference in the fuel system across the device 19 will be controlled at ground level and at 40,000 ft. respectively and it will be seen that in this range the curve A is very flat and is approximately a straight line. In other words, the fuel required by the engine to maintain a constant idling or low-power rotational speed of the engine is substantially directly proportional to the atmospheric air pressure $P_1$.

Curve B illustrates the fuel flows which will be obtained with a simple orifice such as the orifice means 70 having an effective area at controlled pressure difference $P_0$ to give a fuel flow necessary to maintain the preselected idling speed at ground level. It will be seen that for values of the controlled pressure difference below $P_0$ the curve B departs from the curve A and that for any value of the pressure difference other than the value $P_0$ the actual fuel flow to the engine will exceed the engine requirements. In other words, with a simple orifice such as the orifice 70 selected to give the required fuel flow at controlled pressure difference $P_0$, the engine rotational speed will increase as the value of the controlled pressure difference decreases.

Curve C is a straight line and represents the fuel flows which will be obtained with the device 19 with the orifice 70 completely closed, and it will be seen that by suitable selection of the fuel-flow/pressure drop characteristics of the orifice means 74 to 76 and orifice means 77 or by suitable selection of the fuel-flow/pressure drop characteristics of the orifice means 77 alone where the orifice means 74 to 76 are omitted, the fuel flow to the engine can be controlled to be substantially equal to the fuel requirements for each atmospheric air pressure in the range of operation. In other words, the arrangement of the orifice-type fuel-flow metering device of this invention enables a substantially constant engine rotational speed to be maintained under idling or low-power conditions irrespective of altitude and without adjustment of the area of the orifice 70.

If desired it may be arranged that when the control lever 73 is adjusted to select idling or low-power operation of the engine, the orifice 70 is opened by a small amount, so that part of the fuel being delivered to the engine passes through the orifice 70 and part through the orifice 79. Under these conditions the fuel-flow/pressure drop characteristic of a device comprising the orifice 70 and the orifice means 77 will be a flattish curve.

I claim:

1. In a fuel supply system for a gas-turbine engine comprising fuel injectors, a fuel delivery pipeline to the fuel injectors, an orifice-type fuel-flow-metering device controlling the flow in said pipeline, means controlling the pressure of said system to maintain a difference in the pressure upstream and downstream of said metering device so as to be a predetermined value which varies in a substantially directly proportional manner to an atmospheric air pressure, said metering device comprising a duct forming part of the fuel delivery pipeline, a first member in said duct affording a first orifice, an adjustable valve member cooperating with said first orifice to determine its effective area, manual means to positively close the adjustable valve member and to select the effective area of said first orifice, the fuel flow through said orifice for each selected effective area being therefore proportional to the square root of the pressure drop across it, a second member in said duct affording a second orifice which is hydraulically in parallel with said first orifice, means responsive to the pressure drop across said second orifice for controlling the fuel flow through said second orifice comprising a floating valve member which member has a conical head to cooperate with said second orifice to vary its effective area, and a spring arranged to load said floating valve member in a manner tending to reduce the effective area of said second orifice, said conical head having such a conicity and said spring having such a rate that, for any given pressure drop across said second orifice, the floating valve member takes up a position with respect to the second orifice to permit a fuel flow therethrough substantially proportional to the pressure drop, said orifice-type fuel-flow-metering device being arranged so that the pressure drop across the two orifices is determined by the controlled pressure difference, and said orifices and valve members having such characteristics that, for a selected area of said first orifice, the fuel flow through said device as determined by each predetermined value of said controlled pressure difference is substantially equal to the engine fuel requirements at the corresponding atmospheric air pressure.

2. A fuel system as claimed in claim 1, wherein for idling or low-power operation of the engine, the first orifice is selected to have a zero effective area and wherein the second orifice has a fuel-flow/pressure drop characteristic such that the fuel flow through the orifice-type fuel-flow-metering device as determined by each value of the controlled pressure difference in the fuel system is substantially equal to the engine fuel requirements at the corresponding atmospheric air pressure.

3. A fuel system for a gas-turbine engine comprising a source of pressure fuel, a fuel-flow-metering device connected to said source of pressure fuel to control a flow therefrom, and comprising a first orifice, a throttle element to co-operate with said first orifice, said throttle element being arranged for adjustment to select the effective area of said first orifice and to positively close said orifice, a second orifice connected to be hydraulically in parallel with said first orifice, means responsive to the pressure drop across said second orifice for controlling the fuel flow through said second orifice comprising a valve member arranged to co-operate with said second orifice to vary its effective area and arranged to be displaceable by the pressure drop across said second orifice to increase the effective area on increase of the pressure drop, a spring arranged to load said valve member to oppose its displacement by the pressure drop, thereby to hold said valve member in a position for each pressure drop such that the fuel flow through the orifice is directly proportional to the pressure drop; means to adjust the fuel pressure upstream of said metering device; and pressure-responsive means responsive to an atmospheric air pressure and to the pressure drop across said metering device and operative to control said pressure-adjusting means to maintain the pressure drop across the device substantially directly proportional to said atmospheric air pressure.

4. A fuel system for a gas-turbine engine which fuel system comprises an orifice-type fuel-flow-metering device comprising a first orifice, a throttle element to co-operate with said first orifice, said throttle element being arranged for adjustment to select the effective area of said first orifice and to positively close said orifice, a second orifice connected to be hydraulically in parallel with said first orifice, means responsive to the pressure drop across said second orifice for controlling the fuel flow through said second orifice comprising a valve member arranged to co-operate with said second orifice to vary its effective area and arranged to be displaceable by the pressure drop across said second orifice to increase the effective area on increase of the pressure drop, and a spring arranged to load said valve member to oppose its displacement by the pressure drop, thereby to hold said valve member in a position for each pressure drop such that the fuel flow through the orifice is directly proportional to the pressure drop; and comprises also a pressure-responsive device arranged to be responsive to an atmospheric air pressure and arranged to maintain the pressure drop across the orifice-type fuel-flow-metering device and thus across said first and second orifices at a predetermined value which varies with the atmospheric air pressure to be substantially directly proportional thereto.

5. A fuel system for a gas-turbine engine which fuel system is of the class comprising an orifice-type fuel-flow-metering device and a pressure-responsive device arranged to be responsive to an atmospheric air pressure and arranged to control the difference in fuel pressures on each side of said orifice-type fuel-flow-metering device to be a predetermined value which is substantially directly proportional to the atmospheric air pressure, and which fuel system is characterized in that the orifice-type fuel-flow-metering device comprises a first orifice, a throttle element to co-operate with said first orifice, said throttle element being arranged for adjustment to select the effective area of said first orifice and to positively close said orifice, a second orifice connected to be hydraulically in parallel with said first orifice, means responsive to the pressure drop across said second orifice for controlling the fuel flow through said second orifice comprising a valve member arranged to co-operate with said second orifice to vary its effective area and arranged to be displaceable by the pressure drop across said second orifice to increase the effective area on increase of the pressure drop, a spring arranged to load said valve member to oppose its displacement by the pressure drop, thereby to hold said valve member in a position for each pressure drop such that the fuel flow through the orifice is directly proportional to the pressure drop.

6. In a fuel system for a gas-turbine engine comprising fuel injectors, a fuel delivery pipeline to the fuel injectors, a fuel-flow-metering device controlling the flow in said pipeline, means controlling the pressure of said system to maintain a difference in the pressure upstream and downstream of said metering device so as to be a predetermined value which varies in a substantially directly proportional manner to an atmospheric air pressure comprising a variable delivery liquid fuel pump for delivering fuel to said pipeline and having an output-varying member, an actuating member connected to actuate said output-varying member and arranged to be exposible at opposite sides to liquid pressure, a valve adapted to relieve the liquid pressure at one side of the actuating member, actuating means for said valve, an atmospheric-pressure-responsive device to load said actuating means in the sense of decreasing said pump output on decrease of atmospheric pressure, fuel-pressure-responsive means to load said actuating means, and resilient means to load said actuating means in the sense of increasing said pump output, said metering device being connected to the delivery of said pump to pass the output of said pump and comprising a first orifice, a selectively-adjustable member cooperating with said first orifice and arranged to be set in position relative to said orifice to determine its effective area and to positively close said first orifice, the fuel flow through said first orifice for each selected effected area being therefore proportional to the square root of the pressure drop across it, a second orifice connected hydraulically in parallel with said first orifice, means responsive to the pressure drop across said second orifice for controlling the fuel flow through said second orifice comprising an area-determining member cooperating with said second orifice and arranged to be displaced by the pressure drop across said second orifice in a direction to increase the effective area of said second orifice, and resilient means to oppose displacement of said area-determining means, said area-determining member being so shaped and said spring having such a load that the fuel flow therethrough is substantially directly proportional to the pressure drop across said second orifice, a first pressure connection from upstream of said orifice-type fuel-flow-metering device to load said fuel-pressure-responsive means and thus said actuating means in the sense of decreasing said pump output on increase of said upstream pressure; and a second pressure connection from downstream of said fuel-flow-metering device to said fuel-pressure-responsive means to load it in opposition to the load applied through said first pressure connection.

7. In a fuel system for a gas-turbine engine comprising fuel injectors, a fuel delivery pipeline to said injectors, an orifice-type fuel flow-metering device controlling the flow in said pipeline, means controlling the pressure of said system to maintain a difference in the pressure upstream and downstream of said metering device so as to be a predetermined value which varies in a substantially directly proportional manner to an atmospheric air pressure comprising a variable-delivery fuel pump having an output-varying member for delivering fuel to the pipeline, an actuating member to actuate said output-varying member and arranged to be exposible at opposite sides to liquid pressure, a valve adapted to relieve the liquid pressure at one side of the actuating member, actuating means for said valve, an atmospheric-pressure-responsive device to apply a first load to said actuating means in the sense of increasing said first load on decrease of atmospheric pressure, fuel-pressure-responsive means connected to said pipeline to apply a second load to said actuating means, resilient means to apply a third load to said actuating means in opposition to said first and second loads, said metering device being connected to the delivery of said pump to pass the fuel flow from said pump and comprising a first orifice, an area-selecting member cooperating with said first orifice and arranged for adjustment to select the effective area of said first orifice and to positively close said first orifice, a second orifice connected hydraulically in parallel with said first orifice, means responsive to the pressure drop across said second orifice for controlling the fuel flow through said second orifice comprising an area-determining member cooperating with second orifice and arranged to be displaced by the pressure drop across said second orifice in a direction to increase the effective area of said orifice, a spring to load said area-determining member in opposition to the pressure drop thereby, for each value of said pressure drop, to hold the area-determining member in a position to permit a flow through said second orifice which is substantially directly proportional to the pressure drop, a first pressure connection from upstream of said fuel-flow-metering device to one side of said fuel-pressure-responsive means, and a second pressure connection from downstream of said fuel-flow-metering device to the other side of said fuel-pressure-responsive means, whereby, on closure of said first orifice by the area-selecting member, the pressure drop across said second orifice means and thus the fuel flow to the fuel injectors is maintained substantially directly proportional to atmospheric air pressure.

8. In a fuel system for a gas-turbine engine comprising fuel injectors, a fuel delivery pipeline to the fuel injectors, a fuel-flow-metering device connected to control the flow in the pipeline, means controlling the pressure of said system to maintain a difference in the pressure upstream and downstream of said metering device so as to be a predetermined value which varies in a substantially directly proportional manner to an atmospheric air pressure comprising a variable-delivery fuel pump connected to the pipeline, means to vary the delivery of said pump, said metering device comprising a first orifice, a throttle element to cooperate with said first orifice, said throttle element being arranged for adjustment to select the effective area of said first orifice and to positively close said first orifice, the fuel flow through said orifice for each selected effective area being therefore proportional to the square root of the pressure drop across it, a second orifice connected to be hydraulically in parallel with said first orifice, means responsive to the pressure drop across said second orifice comprising a valve member arranged to cooperate with said second orifice to vary its effective area and arranged to be displaceable by the pressure drop across said second orifice to increase the effective area on increase of the pressure drop, and a spring arranged to load said valve member to oppose its displacement by the pressure drop, thereby to hold said valve member in a position for each pressure drop such that the fuel flow through the orifice is directly proportional to the pressure drop.

9. A fuel system for a gas-turbine engine comprising a source of pressure fuel, a fuel-flow-metering device connected to said source of pressure fuel to control a flow therefrom, and comprising a first orifice, a throttle element to cooperate with the first orifice, said throttle element being adjustable to fixed positions with respect to the first orifice so as to fixedly select the flow area through the first orifice, a second orifice connected to be hydraulically in parallel with said first orifice, means responsive to the pressure drop across said second orifice for controlling the fuel flow through said second orifice comprising a valve member arranged to cooperate with said second orifice to vary its effective area and arranged to be displaceable by the pressure drop across said second orifice to increase the effective area on increase of the pressure drop, and a spring arranged to load said valve member to oppose its displacement by the pressure drop, thereby to hold said valve member in a position for each pressure drop such that the fuel flow through the orifice is directly proportional to the pressure drop; means to adjust the fuel pressure upstream of said metering device; and pressure-responsive means responsive to an atmospheric air pressure and to the pressure drop across the said metering device and operative to control said pressure-adjusting means to maintain the pressure drop across the device substantially directly proportional to said atmospheric air pressure.

10. A fuel system as claimed in claim 9, wherein for idling or low-power operation of the engine, the first orifice is selected to have a small flow area and wherein the second orifice has a fuel-flow/pressure drop characteristic such that the fuel flow through the orifice-type fuel-flow-metering device as determined by each value of the controlled pressure difference in the fuel system is substantially equal to the engine fuel requirements at the corresponding atmospheric air pressure.

11. In a fuel supply system for a gas-turbine engine comprising fuel injectors, a fuel delivery pipeline to the fuel injectors, an orifice-type-fuel-flow-metering device controlling the flow in said pipeline, means controlling the pressure of said system to maintain a difference in pressure upstream and downstream of said metering device so as to be a predetermined value which varies in a substantially directly proportional manner to an atmospheric air pressure, said metering device comprising a duct forming part of the fuel delivery pipeline, a first member in said duct affording a first orifice, adjustable valve means for determining the effective area of said first orifice and to positively close said first orifice, the fuel flow through said orifice for each selected effective area being therefore proportional to the square root of the pressure drop across it, a second member in said duct affording a second orifice which is hydraulically in parallel with said first orifice, means responsive to the pressure drop across said second orifice for controlling the fuel flow through said second orifice comprising valve means comprising a conical head for varying the effective area of said second orifice, and resilient means for loading said conical head in a manner tending to reduce the effective area of said second orifice, said conical head having such a conicity and said resilient means having such a rate that for any given pressure drop across said second orifice, said conical head valve means takes up a position with respect to the second orifice to permit a fuel flow therethrough substantially proportional to the pressure drop; said orifice-type fuel-flow-metering device being arranged so that the pressure drop across the two orifices is determined by the controlled pressure difference; and said orifices and valve means having such characteristics that, for a selected area of said first orifice, the fuel flow through said device as determined by each predetermined value of said controlled pressure difference is substantially equal to the engine fuel requirements at the corresponding atmospheric air pressure.

References Cited in the file of this patent

UNITED STATES PATENTS

| Number | Name | Date |
| --- | --- | --- |
| 2,474,033 | Chamberlin et al. | June 21, 1949 |
| 2,503,048 | Ifield | Apr. 4, 1950 |
| 2,524,444 | Ifield | Oct. 3, 1950 |
| 2,534,821 | Ifield | Dec. 19, 1950 |
| 2,536,556 | Lawrence | Jan. 2, 1951 |

FOREIGN PATENTS

| Number | Country | Date |
| --- | --- | --- |
| 618,145 | Great Britain | Feb. 17, 1949 |